United States Patent [19]

Duvdevani et al.

[11] Patent Number: 4,801,498

[45] Date of Patent: Jan. 31, 1989

[54] SUBSTRATES COATED WITH NEUTRALIZED CARBOXYLATED POLYMERS

[75] Inventors: Ilan Duvdevani, Leonia; Pacifico V. Manalastas, Edison; Evelyn N. Drake, Lebanon, all of N.J.

[73] Assignee: Exxon Research and Engineering Company, Florham Park, N.J.

[21] Appl. No.: 923,193

[22] Filed: Oct. 27, 1986

[51] Int. Cl.$^4$ ............................ B05D 7/00; B32B 9/04
[52] U.S. Cl. ..................................... 428/334; 428/403; 428/407; 428/402.24; 428/704; 428/543; 427/221; 427/222; 427/212; 71/64.07; 71/11; 71/28; 252/383
[58] Field of Search ............... 428/403, 704, 407, 543, 428/334; 427/221, 222

[56] References Cited

U.S. PATENT DOCUMENTS

| | | | |
|---|---|---|---|
| 3,223,518 | 12/1965 | Hansen | 427/212 |
| 3,321,298 | 5/1967 | Bidlack, Sr. et al. | 427/212 |
| 4,185,988 | 1/1980 | Kistler et al. | 427/221 |

FOREIGN PATENT DOCUMENTS

| | | | |
|---|---|---|---|
| 0152083 | 8/1985 | European Pat. Off. | 428/403 |
| 0065010 | 5/1977 | Japan | 428/403 |

*Primary Examiner*—P. C. Ives
*Attorney, Agent, or Firm*—Richard E. Nanfeldt

[57] ABSTRACT

A composite comprising: a substrate; and a polymeric coating adhered to at least one surface of said substrate, said polymer coating having a thickness of about 1 to about 100 micrometers, wherein said polymer coating comprises a neutralized carboxylated polymer having a carboxylate content of about 5 to about 300 meq. per 100 grams of said neutralized carboxylated polymer.

7 Claims, No Drawings

SUBSTRATES COATED WITH NEUTRALIZED CARBOXYLATED POLYMERS

FIELD OF THE INVENTION

The present invention relates to polymeric coatings having improved barrier properties wherein the polymeric coating is formed from an organic solution of a neutralized carboxylated polymer.

DESCRIPTION OF PRIOR ART

Solids (e.g., substrates, pipes, slabs, sheets, etc.) can be protected from the external environment with the use of barrier or protective coating materials. For protection from water or moisture, polymer or organic materials are widely used. For cost effectiveness, however, these materials are generally applied as thin films. The thickness of the film depends upon the desired degree of water protection. The thicker the film the more likely that water penetration would be slowed down. In practice, applying an effective thin coating is difficult because of the various stresses tending to make the film discontinuous (e.g., film-rupture, pin holes). Films will rupture when a threshold stress is exceeded. The lateral stress tending to rupture a film is inversely proportional to an expotential power of the film thickness. The thinner the film, the more easily it will rupture. To provide film strength current practice requires the establishment of crosslinks in the coating by curing. Crosslinking (curing) can also improve the coating's resistance to some chemicals. Thin films which consist of molecules in relatively random configurations with a high degree of entanglements are superior to films containing molecules in relatively coiled states with few molecular entanglements. Accordingly, polymers containing associating ionic groups (ionomers) which have a high degree of molecular interactions should make excellent protective or barrier films.

There are many applications for thickened or gelled soltuions of polymers in organic liquids which are quite diverse. There are also a number of physical and chemical techniques for preparing such systems. The present invention concerns a process for forming a polymer coating having improved barrier properties.

Coatings which can be protective, decorative or special purpose are usually applied at thicknesses of as high as 50 micrometers or thicker in order to provide the desired properties required of such coatings. Such high thicknesses are required in order to compensate for coating defects or for poor coating material properties.

Coatings with improved properties may be applied as thin films having a thickness range of 1–100 micrometers, with a preferred range of 2–20 micrometers. In order for such coatings to be functional, they have to meet one or more of the following criteria: the coating material should show improved barrier properties; the applied thin coating should be a continuous film with few or no defects; and there should be a proper adhesion between the coated material and the coating.

The material used in the thin film coating should have an optimized balance of properties, such as elasticity, toughness, hardness, abrasion resistance, etc., for durability under adverse conditions. For special coatings, surface properties, such as surface tension or tribological properties, may need to be met.

The discovery of the film forming properties of ionomers has made possible the extension of their use to coating applications, including controlled release products in agriculture (e.g., controlled release fertilizer). In controlled release fertilizer applications coatings of ionomers will act as barriers to water soluble constituents of the fertilizer, shielding them from premature release in aqueous environments for periods ranging from several days to several months. Because of their unique barrier properties ionomers can potentially be used to make cost effective controlled release fertilizers. The benefits obtained by the use of these coatings can include labor savings, increased crop yield, increased nitrogen utilization efficiency and time savings. The amount of premium is proportional to the cost of coating used on the controlled release product. Therefore, it is of economic importance to use as little coating material as possible to make a desirable agricultural product. The amount of coating which should be applied on the controlled release product, however, is not only dictated by economic considerations, but also by the required performance. In most cases the performance requirements include the control of the release or dissolving property of the agricultural material, achievable with the application of coatings free of fine pinholes or defects. Herein lies the major problem in controlled release fertilizer, particularly with existing conventional coatings, because the thinner the coating or the less coating material is applied the less likely that defect free coatings can be made. Thus, commercially available controlled release fertilizer products are with thick (>40 microns) coatings to yield acceptable performance (e.g., <20% release of water soluble nutrient in seven days in water at 20° C.). As a consequence, these products are expensive and have found limited uses. With the discovery of ionomer coatings, however, the application of thin (<20 microns), defect-free films on controlled release fertilizer can now be achieved; thus, its use presents a potential route for making affordable controlled release fertilizer.

The instant invention teaches that a solution of a neutralized carboxylated polymer can meet many of the requirements for an improved thin film coating.

SUMMARY OF THE INVENTION

The present invention relates to a process for forming a polymeric coating having improved barrier properties from an organic solution of an organic liquid and a neutralized carboxylated polymer.

GENERAL DESCRIPTION

The component materials for forming the polymeric coatings of the instant invention generally include a water insoluble neutralized carboxylated polymer dissolved in an organic solvent system to form a solution with a concentration level of 0.1 to 20 weight percent of the neutralized carboxylated polymer. The solvent system comprises an organic solvent with or without a cosolvent. The solvent can be an organic liquid which is capable of dissolving the polymeric backbone. A cosolvent may be needed to break up associated domains resulting from aggregation of ionic species.

The water insoluble carboxylated polymers of the instant invention will comprise from about 1 to about 500 milliquivalents of pendant carboxylate groups per 100 grams of polymer, more preferably from 5 to 300 meq. pendant carboxylated groups. The carboxylate groups are neutralized with counterions selected from, but not limited to, Groups IA, IB, IIA, and IIB of the Periodic Table of Elements, as well as lead, tin, zinc and antimony, or ammonium and amine counterions.

The degree of neutralization of the carboxylate groups of the neutralized carboxylated polymers may vary from 0 (free acid form) to 100 mole percent, preferably 50 to 100 mole percent. With the utilization of neutralized carboxylated polymers in this instant invention, it is preferred that the degree of neutralization be substantially complete, that is, with no substantial free acid present and without substantial excess of the base, other than that needed to ensure neutralization. The neutralized carboxylates possess greater thermal stability and better mechanical properties (such as toughness) compared to their acid form. Thus, it is clear that the polymers which are normally utilized in the instant invention comprise substantially neutralized carboxylated groups and, in fact, an excess of the neutralizing material may be utilized without defeating the objects of the instant invention.

The neutralized carboxylate polymers of the instant invention may vary in number average molecular weight from 1,000 to 10,000,000, preferably 5,000 to 1,000,000, most preferably from 10,000 to 600,000. These polymers may be prepared by methods known in the art, such as a copolymerization where one of the monomers is a carboxylate containing monomer.

Neutralized carboxylated polymers used in the instant invention are characterized by the formula:

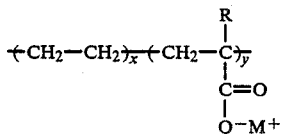

wherein Y is about 0.1 to about 30 mole percent, more preferably about 0.5 to about 20, and most preferably about 1 to about 15; R is hydrogen, an ethyl or a methyl group; wherein $M^+$ is selected from the group consisting of ammonium counterions, amine counterions and metal counterions selected from, but not limited to, the group consisting of lead, antimony, zinc, tin and Groups IA, IB, IIA and IIB of the Periodic Table of Elements.

The concentration of the neutralized carboxylated polymer in the solution of the neutralized carboxylated polymer and the organic solvent, and optionally the cosolvent, is about 0.1 to about 20 weight percent, more preferably about 0.5 to about 10, and most preferably about 0.5 to about 6.0.

The organic solvent is selected from the groups consisting of aromatic solvents, oxygen-containing solvents, such as esters, ketones, ethers, aldehydes and carboxylic acids, and amines, amides, alcohols and mixtures thereof. Preferred organic solvents are tetrahydrofuran, acetic acid, xylene and toluene.

In order to reduce the viscosity of an organic solution of the neutralized carboxylated polymer so as to be able to employ the organic solution in a casting process, a polar cosolvent may be added to the organic solution of the neutralized carboxylated polymer to solubilize the pendant carboxylate groups. The polar cosolvent will have a solubility parameter of at least 10.0, more preferably at least 11.0, and may comprise from 0.01 to 15.0 weight percent, preferably 0.1 to 5.0 weight percent, of the total mixture of organic liquid, water insoluble neutralized carboxylated polymer and polar cosolvent.

Normally, the polar cosolvent will be a liquid at room temperature, however, this is not a requirement. It is preferred, but not required, that the polar cosolvent be soluble or miscible with the organic liquid at the levels employed in this invention. The polar cosolvent is selected from the group consisting essentially of alcohols, amines, amides, acetamides, phosphates, or lactones and mixtures thereof. Especially preferred polar cosolvents are aliphatic alcohols, such as methanol, ethanol, n-propanol, isopropanol, 1,2-propane diol, monoethyl ether of ethylene glycol and n-ethylformamide.

The elastomeric coatings of the instant invention are formed by applying the organic solution of the neutralized carboxylated polymer over the substrate at an ambient temperature or at 5°–80° C., by either dip-coating or spray-coating or with the use of other techniques for thin spreading (such as brushing). The organic solvent system is then permitted to evaporate with or without the aidn of forced drying gas, such as air or nitrogen gas. This step is called the drying process. The drying gas temperature can be from ambient temperature up to the boiling point of the organic solvent system. Preferably the temperature of the drying gas is between 20° C. to 100° C. The most preferred temperature of the drying gas should be about 70° C. for fast evaporation of the organic solvent system. After drying the thickness of the applied coating should be about 1 micrometer to about 100 micrometers. Most preferred, the coating thickness should be about 2 to about 20 micrometers for both performance of the applied coating, the solution concentration of the neutralized carboxylated polymer is applied at 0.5 to 10 weight percent. Most preferably, the concentration should be about 2 to 5 weight percent. The coating solution of the neutralized carboxylated polymer can be applied in single or multiple layers, depending on the desired coating thickness. In any instance, the organic solvent system is evaporated after each layer application. The neutralized carboxylated polymer coating can be applied over the substrate of interest or over a previous coating. In the latter case, such practice can modify or improve the performance of the coated system.

A variety of substrates which are discrete particulate solids may be encapsulated to form advantageous products. In some applications substrates are required to be released in a slow or controlled manner in given environments. Examples include: fertilizers, micronutrients, coated seeds, synthetic reagents or catalysts, pharmaceutical and drugs. Substrates can also be modified by encapsulation in cases where their solid surfaces need to be more compatible when they are added to other materials. Examples are engineering plastics, adhesives or rubbers with incorporated filler particles, such as ground lime or titanium dioxide.

The neutralized carboxylated polymeric coating can be used as a barrier or controlled release coating for applications such as fertilizer, micronutrients or other solid materials.

Urea or other water soluble fertilizer granules can be coated to maximize the plant uptake up the applied fertilizer through the minimization of losses, including vaporization, nitrogen fixation and leaching. The coating of urea can be achieved by spraying a solution of a carboxylated ionomer, such as zinc salt of ethylene-methacrylic acid copolymer onto a cascading stream of urea granules through an appropriate technique, such as fluidized bed coating. Examples of fluidized bed coating processes are: conventional spray coating wherein the solid particulates are coated by spraying the coating solution above or below the bed; a Wurster configuration; or a fluidized bed with a rotating bed support plate. It is envisioned that coated urea or other fertilizer particulates can be utilized in a variety of environmental conditions and yet the release of nitrogen or other water soluble nutrients can be controlled in such a way that they are available when the target plant (e.g., cereal) needs them.

DETAILED DESCRIPTION OF THE PREFERRED EMBODIMENT

The following Examples will demonstrate the performance of a neutralized carboxylated polymer as a barrier coating.

EXAMPLE 1

Improved Barrier Properties of an Ionomer Coating

Two different grades of zinc-ethylene/methacrylic acid ionomers (Surlyn 9910 and Surlyn 9970 made by DuPont Co.) were dissolved in boiling tetrahydrofuran (THF). The polymer concentration of each solution was 2 weight percent. These solutions were used for dip coating of the ionomer over solid, dry urea samples in order to determine the barrier properties of the encapsulated urea to water extraction.

To determine barrier properties of films formed from solution, urea slides were coated for immersion tests. The procedures for preparing coated samples of urea slides and conducting immersion tests are described as follows:

Urea samples were prepared by depositing reagent grade urea (Fisher Scientific) over microscope glass slides. This was done by dipping glass slides into molten urea at a temperature of about 135°–145° C., followed by cooling and solidification of the urea layer. The urea layer was built up to about 7 mm by four to five successive dipping and cooling cycles. These urea samples were then coated by a polymeric film using a second dipping procedure. Urea slides were repeatedly dipped into polymer solutions, such as those described above, followed by drying in a vacuum oven at 70° C. for about 3 hours. The dipping and drying cycles were repeated until the film thicknesses shown in Table I were obtained. The carboxylated ionomer solutions in THF were kept at an elevated temperature of 40°–60° C. during the dipping process to avoid polymer precipitation.

The barrier properties of the various polymeric films were determined by immersion of each coated urea slide in about 100 g of deionized water at room temperature. The amount of urea released into the water was determined by recovering the urea after evaporating the water. Each sample was initially immersed for 1 day, followed by immersion in fresh water for 3 days and for weekly intervals thereafter.

Table I shows the permeabilities of urea solution extracted from the coated slides which were immersed in water at room temperature. The permeabilities of the coating materials were determined by applying Fick's law of diffusion at steady state. Fick's law states that:

$$J_m = DA \frac{\Delta C}{\delta}$$

where $J_m$=mass flux (loss) through the film or membrane, $A$=transport area, $\Delta C$=concentration gradient, $\delta$=film or membrane thickness and $D$=membrane diffusivity constant which is equal to the ratio of permeability (P) over the solubility ratio (K) of urea in the membrane and in water.

The performance of the ionomer coatings was compared with that of two commercially used coating materials. The first commerial coating solution was a tung oil solution made by Formby of Mississippi at 30 weight percent solids in petroleum distillate. The second commercial coating solution was linseed oil modified polyurethane Type I made by Minwax Paint Co. of NJ at 45% solids in petroleum distillate. The two commercial coatings were cured at 70° C. for 48 hours after coating.

The permeability of urea solution through the ionomer films was found to be about 2 orders of magnitude lower than either that of tung oil or that of polyurethane. Tung oil and polyurethane were disclosed as release control coatings for water soluble fertilizers in U.S. Pat. Nos. 3,321,298 and 3,223,518.

The reason for scatter in the permeability data for ionomer coatings shown in Table I is believed to be a result of the coating quality. Existence of pin holes will increase the apparent permeability as calculated above. One should, therefore, assume that the lowest number corresponds to a more perfect coating. Permeabilities for the other polymers in Table I do, on the other hand, agree with literature data for perfect coatings with these polymers.

This Example shows that encapsulated urea having an ionomer coating is much more resistant to extraction by water than is the urea encapsulated by commercially used coatings. One can, therefore, apply a thinner coating of the ionomer for equivalent results to obtain a cost advantage or the ionomer coatings can be useful for a slower release.

TABLE I

| Sample No. | Coating Material | Film Thickness Microns | Permeability (P = DK) cm²/sec |
|---|---|---|---|
| 141-3 | Tung Oil | 75 | $4.3 \times 10^{-9}$ |
| 141-6 | Tung Oil | 125 | $7.6 \times 10^{-9}$ |
| 158-4 | Polyurethane | 100 | $1.3 \times 10^{-9}$ |
| 158-5 | Polyurethane | 40 | $2.1 \times 10^{-9}$ |
| S-9910 | Ionomer | 70 | $4.2 \times 10^{-9}$ |
| S-9970-A | Ionomer | 70 | $2.7 \times 10^{-11}$ |
| S-9970-B | Ionomer | 70 | $2.8 \times 10^{-10}$ |

Permeability of Urea Solution from Coated Urea Slides in Water at Room Temperature

What is claimed is:

1. A composite consisting essentially of:
    (a) a substrate; and
    (b) a polymeric coating adhered to at least one surface of said substrate, said polymer coating having a thickness of about 1 to about 100 micrometers, wherein said polymer coating comprises a neutralized carboxylated polymer having a carboxylate content of about 5 to about 300 meq. per 100 grams of said neutralized carboxylated polymer, said polymer coating of a thickness of about 70 microns having a permeability of less than about $2.8 \times 10^{-10}$ cm²/sec, wherein said neutralized carboxylated polymer is characterized by the formula consisting of:

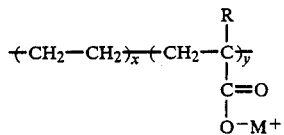

wherein y is about 0.1 to about 30 mole percent, R is selected from the group consisting of hydrogen, a methyl group and an ethyl group and M+ is selected from the group consisting of ammonium counterions, amine counterions and metal counterions, wherein said metal counterions is selected from the group consisting of lead, antimony, zinc, tin and Groups IA, IIA, IB and IIB of the Periodic Table of Elements.

2. A composite according to claim 1 wherein said carboxylate groups are neutralized with an ammonium or metal counterion.

3. A composite according to claim 2 wherein said metal counterion is selected from the group of transition elements and Groups IA, IIA, IB and IIB of the Periodic Table of Elements.

4. A composite according to claim 3 wherein said carboxylate groups are at least 20 mole percent neutralized.

5. A composite according to claim 1 wherein said substrate is a fertilizer.

6. A composite according to claim 1 wherein said substrate is urea.

7. A composite according to claim 1 wherein said substrate is a micronutrient.

* * * * *